United States Patent [19]

Mede et al.

[11] 4,083,296
[45] Apr. 11, 1978

[54] CREPE MAKING MACHINE

[76] Inventors: George Mede; Roberto R. Mede; Thomas Mede, all of 5573 Robinson Avenue, Montreal, Quebec, Canada

[21] Appl. No.: 767,039

[22] Filed: Feb. 9, 1977

[51] Int. Cl.² .............................................. A47J 37/10
[52] U.S. Cl. ..................................... 99/423; 99/443 R
[58] Field of Search .................. 99/423, 424, 386, 387, 99/393, 407, 443, 353, 355

[56] References Cited

U.S. PATENT DOCUMENTS

| 3,225,716 | 12/1965 | Krooss et al. | 99/423 |
| 3,349,724 | 10/1967 | Tavan | 99/423 |
| 3,718,487 | 2/1973 | Brunner | 99/353 |

Primary Examiner—Leonard D. Christian
Attorney, Agent, or Firm—Diller, Brown, Ramik & Wight

[57] ABSTRACT

A pancake or crepe making machine which comprises a support structure movably mounted on a griddle.

The support structure includes a pair of spaced-apart end members rigidly interconnected by a plurality of laterally extending, spaced-apart members. A lower laterally extending member supports at least one dispenser for dispensing dough onto a surface of a griddle. An upper laterally extending member supports means for actuating the at least one dispenser. Means are provided for advancing the support structure along a length of a griddle on which the support structure is movably mounted. A spreader and leveller means is mounted on the support structure, the spreader and leveller means extending between the spaced apart end members. The spreader means includes a blade, a lower edge of which is spaced slightly above a surface of the griddle. The spreader and leveller means is situated rearwardly of the at least one dispenser, and the blade is mounted at an angle such that the blade extends downwardly and rearwardly away from the at least one dispenser, in a direction of travel of the machine when making crepes or pancakes.

10 Claims, 5 Drawing Figures

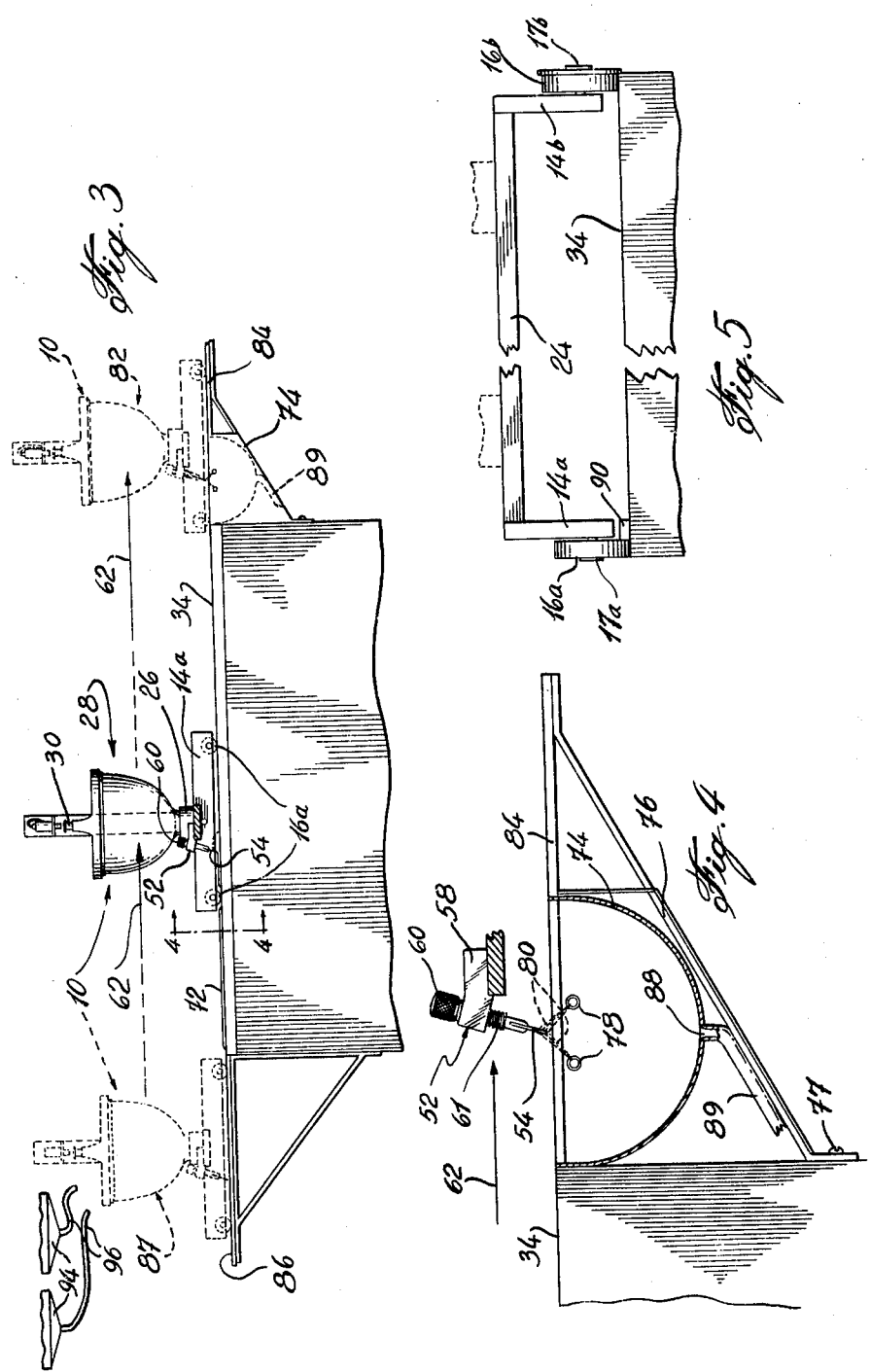

CREPE MAKING MACHINE

BACKGROUND OF THE INVENTION

1. Field of the Invention

This invention relates generally to a machine for use in making crepes, pancakes, tortillas, or the like, and, in particular, to an improved crepe or pancake making machine which can be utilized on an existing griddle structure.

2. Description of the Prior Art

A number of machines for making crepes or pancakes are known in the prior art from manually operated machines which produce one crepe at a time to fully automated machines which produces crepes at a relatively high rate of speed. However, the known manually operated machines do not produce crepes at a sufficient rate of speed to be of practical value in a restaurant or a fast-food outlet. Further, the fully automated machines are of relatively complicated construction and are susceptible to mechanical failure rendering their use in a restaurant or fast-food outlet impractical. Further, automated machines can only cook one side of a crepe or pancake, such that the crepes or pancakes which are produced cannot be readily stacked without sticking together.

Crepe making machines are also known which incorporate a planer blade under a trough which dispenses dough onto a griddle, such that the machine must be removed from the griddle in order to clean the planer blade. Since caked dough remaining on the planer blade functions as an additional irregular scraper or can fall onto the surface of a crepe or pancake, resulting in a defective crepe or pancake which cannot be sold to a consumer, maintaining the planer blade free from caked dough is quite important in order to minimize waste. In addition, known crepe making machines, both automatic and manual, can only effectively operate within a narrow range of dough compositions, such that crepes having varied consistencies cannot be made with such machines.

The present invention overcomes the above drawbacks by providing a pancake or crepe making machine which is relatively inexpensive to manufacture and can produce crepes, pancakes, tortillas, or similar food products utilizing a flour, corn or potato based viscous dough, at a sufficient rate of speed to permit its use in restaurants and fast-food outlets. Further, the machine according to the present invention can be utilized on existing griddle structures with a minimum amount of modification to the griddle. As well, the planer blade on the machine can be adjusted to permit the use of various consistencies of dough, and the blade can be cleaned and its angle relative to the surface of a griddle can be adjusted without lifting the machine off of the griddle.

SUMMARY OF THE INVENTION

According to the present invention, the machine for use in making crepes or pancakes comprises a support structure adapted to be movably mounted on a griddle.

The support structure includes a pair of spaced-apart end members rigidly interconnected by a plurality of laterally extending, spaced-apart members. A lower laterally extending member supports at least one dispenser for dispensing dough onto a surface of a griddle. An upper laterally extending member supports means for actuating the at least one dispenser. Means are provided for advancing the support structure along a length of a griddle on which the support structure is movably mounted. A spreader and leveller means is mounted on the support structure, the spreader and leveller means extending between the spaced-apart end members. The spreader means includes a blade, a lower edge of which is spaced slightly above a surface of the griddle. The spreader and leveller means is situated rearwardly of the at least one dispenser, and the blade is mounted at an angle such that the blade extends downwardly and rearwardly away from the at least one dispenser, in a direction of travel of the machine when making crepes or pancakes.

BRIEF DESCRIPTION OF THE DRAWINGS

In the drawings which illustrate one embodiment of the present invention:

FIG. 3 is a vertical sectional view taken along the center line of the embodiment of the machine according to FIG. 1, illustrating the machine at three separate locations on the surface of a griddle, the end locations being indicated in phantom;

FIG. 4 is an enlarged vertical sectional view of the spreader and leveller means positioned above the cleaning trough at the right end location of the machine illustrated in phantom in FIG. 3; and FIG. 5 is an enlarged end view of a lower portion of the machine, looking in the direction of arrows 4—4 of FIG. 3, with the scraper means removed.

DESCRIPTION OF THE PREFERRED EMBODIMENTS

Figures 1, 2:
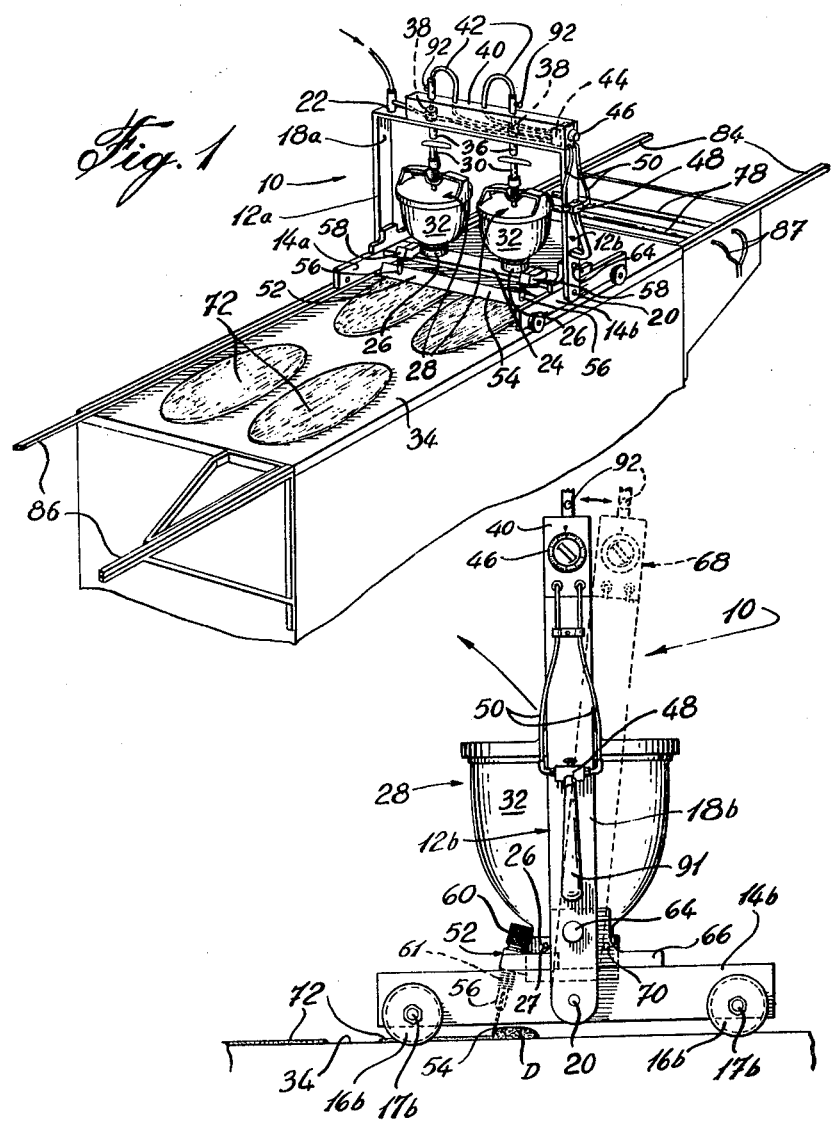
FIG. 1 is a perspective view of one embodiment of the machine according to the present invention mounted on a griddle.
FIG. 2 is an enlarged end view of the embodiment of the machine according to FIG. 1.

The machine for use in making crepes or pancakes is indicated generally in the drawings by reference numeral 10. The machine comprises a support structure including upright end members 12a and 12b, each end member having an inverted T-shaped configuration in side view. The end members 12a and 12b comprise respective lower longitudinally extending members 14a and 14b, each longitudinally extending member having a respective pair of wheels 16a and 16b rotatably mounted thereon, the wheels being releasably secured to their respective members 14a and 14b adjacent opposite ends thereof by means of fasteners 17a and 17b.

Each upright end member 12a and 12b also includes a respective upwardly extending, pivotally mounted member 18a and 18b, the pivotally mounted members being pivotally connected adjacent their respective lower ends by means of pins 20 to respective longitudinally extending members 14a and 14b, at locations approximately midway along the length of the longitudinally extending members. Upper ends of the pivotally mounted members 18a and 18b are rigidly interconnected by an upper laterally extending member 22, while the longitudinally extending members 14a and 14b are rigidly interconnected by a lower laterally extending member 24. The upper and lower laterally extending members 22 and 24 are in vertical alignment when members 18a and 18b are in their vertical positions.

The lower laterally extending member 24 has a pair of spaced-apart metal collars 26 mounted on the upper surface thereof, the metal collars encircling openings which extend through the lower laterally extending member 24. The metal collars 26 support the lower neck portions of respective dispensers 28, with set screws 27 mounted in the collars to engage the respective neck portions, such that the dispensers are releasably mounted on the lower laterally extending member 24. The dispensers 28 are of known construction, such as the depositor sold commercially by Belshaw Bros. Inc. of Seattle, Washington. Since the depositor is of known construction and, as such, does not form an essential part of the present invention, the same has not been described in detail in this application. Generally, however, the dispenser 28 has a plunger assembly 30 which, when actuated, deposits a quantity of dough from a hopper assembly 32 onto a surface of a griddle 34. Actuation of the plunger assembly 30 is effected by means of actuating members 36, the latter comprising the pistons of fluid actuated cylinders 38 mounted within a plastic housing 40. The housing 40 is situated on the upper surface of the upper laterally extending member 22. The lower ends of the actuating members 36 engage the upper surfaces of the plunger assemblies 30 of the respective dispensers 28. The fluid actuated cylinderrs 38 have control lines 42 connected thereto, the control lines extending from the cylinders 38 to a three position controller 44 mounted within the housing 40. The controller 44 has an adjusting knob 46 situated on the outer end surface of the housing 40 to permit manual adjustment of the actuating sequence of the cylinders 38, whereby one or other, or both, of the dispensers may be actuated as desired. A button for actuating the cylinders 38 is mounted on the outer surface of the upwardly extending, pivotally mounted member 18b, the actuating button 48 being interconnected to the controller 44 by a pair of tubes 50.

A spreader and leveller means 52 is mounted on the lower laterally extending member 24, the spreader and leveller means including a planer blade 54 made from Teflon, stainless steel, or similar suitable material. The planer blade 54 is supported at spaced-apart locations by means of adjusting acrews 56 which are mounted in cooperating threaded openings situated in support blocks 58. The support blocks 58 are rigidly mounted on the lower laterally extending member 24. An upper end of each adjusting screw 56 has a knurled outer surface 60 to facilitate turning of the adjusting screw, the adjusting screws permitting the raising and lowering of a lower edge of the planer blade 54 relative to the surface of the griddle 34 so as to permit various dough compositions to be utilized. A coil spring 61 is mounted on each adjusting screw 56, an upper end of each spring 61 engaging a lower surface of a respective support block 58, while a lower end of each spring engages a shoulder portion of the adjusting screw 56. The springs 61 maintain a downward pressure on the blade 54, facilitating lowering of the blade 54 when necessary, while permitting the fine adjustment of the level of the lower edge of blade 54. Further, markings are provided on the upper surface of the blocks 58 and a marker line is located on each screw 56 to facilitate adjustment of the lower edge of the blade 54.

The planer blade 54 is situated at an angle relative to the surface of the griddle in order to facilitate spreading and levelling of dough which is deposited on the griddle from the dispensers 28. In this regard, it has been found that a preferable angle of the blade relative to the surface of the griddle is approximately 75°. The spreader and leveller means is situated rearwardly of the dispensers 28 in the direction of movemment of the machine 10 along the length of the griddle when dough is being dispensed on the surface of the griddle. Thus, as best seen in FIG. 3, as the machine 10 is advanced toward the right, as indicated by arrows 62, a quantity of dough D is deposited on the surface of the griddle from the dispensers 28 and is spread and levelled to the desired thickness by the planer blade 54 of the spreader and leveller means 52.

As noted previously, the upwardly extending pivotally mounted members 18a and 18b are pivotally connected adjacent their lower ends to longitudinally extending members 14a and 14b. The members 18a and 18b are pivotally mounted in order to facilitate removal of the dispensers 28 from their metal collars 26, thereby facilitating refilling or replacement of the dispensers. The pivotally mounted members 18a and 18b are retained in a vertical position by means of locking screws 64 which extend through cooperating openings in the respective members 18a and 18b, and engage aligned threaded openings situated in blocks 66. The blocks 66 are rigidly mounted on the upper surface of the longitudinally extending members 14a and 14b. When the locking screws 64 are removed, the pivotally mounted members 18a and 18b can be tilted away from their vertical positions toward the right so as to assume a position 68 indicated in phantom in FIG. 2. The amount of tilting of the members 18a and 18b toward the right is limited by engagement of the members 18a and 18b with stop members 70 rigidly mounted on the outer surface of the blocks 66. In the tilted position of the members 18a and 18b, the upper ends of the plunger assemblies 30 are clear of the actuating members 36, whereby the dispensers 28 may be removed from their respective collars 26.

The use of two dispensers 28 permits the simultaneous use of different types of dough for making crepes or pancakes. For example, one of the dispensers 28 may contain sweet dough, while the other dispenser 28 may contain salty dough. Adjustment of the controller 44 by means of adjusting knob 46 determines which of the doughs will be deposited on the griddle, depending on the particular requirements at any given time.

As indicated above, the controller 44 can be adjusted so that dough is dispensed from each of the dispensers 28 simultaneously. Once the dough D is deposited on the surface of the griddle 34, the dough D is spread by the spreader and leveller blade 54 as the machine 10 is advanced along the length of the griddle. The spreading and levelling of the dough by means of a planer blade 54 results in the formation of oblong crepes or pancakes 72, as best seen in FIG. 1.

The spreading and levelling action of the blade 54 over the dough D also results in the accumulation of dough on the blade. However, since the planer blade 54 is separate from the dispenser units, it is possible to clean the dough from the blade without removing the machine 10 from the griddle. In this regard, it is preferable to remove the dough from the blade prior to each run of the machine along the griddle. The equipment for cleaning the planer blade 54 includes a trough situated at one end of the griddle. As best seen in FIG. 4, the trough 74 is mounted at the end of the griddle by means of brackets 76, the brackets 76 being secured to the end of the griddle by means of fasteners 77. A pair of spaced-apart tubes 78, having water supply lines 87 connected thereto, extend along the length of the trough 74, and are positioned slightly beneath the upper surface of the trough. The tubes 78, which are symmetrically situated on either side of a centerline of the trough have tiny openings along the length thereof. The openings are so positioned as to direct fine sprays 80 of cold water, as seen in FIG. 4, toward a lower edge of the planer blade 54. Each time the machine 10 has completed the forming of crepes or pancakes 72 on the surface of the griddle 34, the machine is brought to rest in position 82. The cleaning equipment is then actuated so that the fine sprays 80 emanating from tubes 78 removes caked dough adhering to planer blade 54. Alternatively, the sprays 80 can be operated continuously thereby avoiding the necessity of providing controls to activate the sprays 80 only when the machine is in position 82. The water and dough removed from the blade 54 accumulates in the bottom of the trough 74, and is removed therefrom via a discharge tube 89 connected to an outlet 88 situated in the bottom of the trough 74, an opposite end of the discharge tube 89 being connected to a drain, not shown in the drawings. Compressed air, steam, or a liquid other than water can be utilized for removing dough from the blade 54.

In position 82, the machine 10 is situated beyond the end of the griddle and is supported by means of a pair of spaced-apart tracks 84, which are engaged by the pairs of wheels 16a and 16b. Likewise, the opposite end of the griddle 34 is provided with a pair of spaced-apart tracks 86 which support the machine 10 in a position 87 indicated in phantom in FIG. 3. In addition to utilizing tracks 84 and 86 which extend outwardly beyond the ends of the griddle 34, the upper surface of the griddle has a member 90 mounted thereon as an extension of one of the tracks 84 and 86. The member 90 is of rectangular cross-section and extends along the length of the upper surface of the griddle and adjacent one side edge thereof. As best seen in FIG. 5, an outer surface of the member 90 is engaged by inner surfaces of the wheels 16a in order to guide the movement of the wheels 16a along the length of the griddle. Further, the wheels 16b have outwardly directed annular flanges, inner surface of which engage a longitudinal upper corner of the griddle 34. In this way, the machine 10 is guided in its movement along the length of the griddle 34. Rather than utilizing member 90, the wheels 16a can be identical to wheels 16b or the machine can be mounted on rails situated apart from the surface of the griddle.

The machine 10 is provided with a handle 91 mounted on the outer surface of the pivotally mounted member 18b, the handle 91 being used by an operator to manually draw the machine along the length of the griddle 34 by an operator. However, it should also be noted that the machine 10 can be easily adapted to automatic movement along the length of the griddle, should it be desired to automate the process of making the crepes or pancakes.

When using the machine 10 to make crepes or pancakes, the machine 10 is initially in the position 87 in FIG. 3. From this position, the machine is manually drawn along the length of the griddle 34, the actuating button 48 being manually depressed at desired locations in order to deposit quantities of dough D onto the surface of the griddle. After the dough D is deposited on the surface of the griddle, the same is engaged by the planer blade 54 as the machine 10 is being manually advanced along the length of the griddle. As a result, crepes, pancakes, or tortillas 72 are formed as the planer blade 54 spreads and levels the dough D over the surface of the griddle. The size of the crepes, pancakes or tortillas which are thus formed will depend upon the amount of dough deposited from the dispensers 28 and the clearance between the lower edge of the blade 54 and the surface of the griddle. The amount of dough deposited on the griddle is controlled by a manual dial control on the dispenser 28. Further, the speed and the stroke of the pistons 30 is varied by adjusting knobs 92 operatively connected to cylinders 38. This adjustment is necessary in that depositing of the dough too quickly can result in splashing of the dough upon engaging the surface of the griddle. Thus, the speed with which the piston 36 engages the plunger assemblies 30 must be appropriately controlled. Further, by turning knob 46, the operator can select which of the dispensers 28 will be actuated, or whether both will be actuated when the button 48 is depressed.

Once the machine 10 reaches position 82, the water sprays 80 are actuated, or are in continuous operation, in order to remove dough which has caked on the scraper blade 54. After the crepes or pancakes 72 are heated on one side, they are manually flipped over and heated on the other side. After baking of the crepes has been completed, the machine 10 is manually returned to its initial position 87 and the process described above is repeated. By baking the crepes on both sides, it is possible to accumulate stacks of the crepes without the same sticking together, as would otherwise occur if the crepes were cooked on one side only.

Storage containers 94 for various types of doughs can be mounted on suitable stands or on a wall at a location close to the griddle. Tubes 96 connected to the containers 94 permit the filling of the dispensers with the desired type of dough. The flow of dough through the tubes 96 can be by gravity or by pressure applied to the storage containers 94, or by other suitable means within the scope of the present invention.

We claim:

1. A machine for use in making crepes, pancakes or tortillas or similar food products made from a flour, corn or potato based viscous dough, the machine comprising:

a support structure adapted to be movably mounted on a griddle, the support structure including a pair of spaced-apart end members rigidly interconnected by a plurality of laterally extending, spaced-apart members;

a lower laterally extending member supporting at least one dispenser for dispensing dough onto a surface of the griddle;

an upper laterally extending member supporting means for actuating the at least one dispenser;

a spreader and leveller means mounted on the support structure, the spreader and leveller means extending between the spaced apart end members and including a planer blade having a lower edge thereof spaced slightly above the surface of the griddle, the spreader and leveller means being situated rearwardly of the at least one dispenser and the planer blade being mounted at an angle such that the planer blade extends downwardly and rearwardly away from the at least one dispenser in a direction of travel of the machine when making crepes, pancakes or the like; and means for advancing the machine along a length of the griddle.

2. A machine according to claim 1, wherein each end member comprises a longitudinally extending member and an upwardly extending member, each upwardly extending member being pivotally secured adjacent a lower end thereof to the longitudinally extending member, the upwardly extending members having at least one locking screw mounted thereon, the upwardly extending members being secured in a vertical position by means of the at least one locking screw which engages a portion of the longitudinally extending member, pairs of spaced-apart wheels being rotatably mounted on the longitudinally extending members, adjacent opposite ends thereof, whereby the support structure is movably mounted on the griddle.

3. A machine according to claim 2, wherein the means for actuating each of the at least one dispensers comprises a fluid cylinder having a piston extending downwardly therefrom, a lower end of the piston adapted to engage an upper end of a plunger assembly situated in the at least one dispenser upon actuation of the fluid cylinder.

4. A machine according to claim 2, wherein the lower laterally extending member has a pair of metal collars mounted thereon in alignment with openings in the lower laterally extending member, each spaced-apart collars releasably supporting a lower end of a respective dispenser.

5. A machine according to claim 1, wherein the spreader and leveller means comprises a pair of support blocks rigidly mounted on the lower laterally extending member, the support blocks having a pair of adjusting screws movably mounted therein, the adjusting screws supporting the planer blade adjacent lower ends thereof, the adjusting screws adapted to raise and lower a level of a lower edge of the planer blade relative to the surface of the griddle, whereby thickness of the crepes, pancakes, or the like can be adjusted as desired.

6. A machine according to claim 5, wherein each adjusting screw has a coil spring mounted thereon, the coil springs biasing the planer blade away from the support blocks.

7. A machine and griddle for use in making crepes, pancakes, tortillas, or similar food products made from a flour, corn or potato based viscous dough, the machine comprising:

a support structure movably mounted on an upper surface of the griddle, the support structure including a pair of spaced-apart end members rigidly interconnected by a plurality of laterally extending, spaced-apart members;

a lower laterally extending member supporting at least one dispenser for dispensing dough onto the surface of the griddle;

an upper extending member supporting means for actuating the at least one dispenser;

spreader and leveller means mounted on the support structure, the spreader and leveller means extending between the spaced-apart end members, the spreader and leveller means including a planer blade, a lower edge of which is spaced slightly above the surface of the griddle, the planer blade being situated rearwardly of the at least one dispenser, and being angled downwardly and rearwardly away from the at least one dispenser in a direction of travel of the machine when making crepes, pancakes, tortillas, or the like; and means for advancing the machine along a length of the griddle;

the griddle having support tracks extending outwardly from at least one end thereof to support the machine beyond the at least one end of the griddle; and means being provided on the surface of the griddle to maintain alignment of the machine as the machine is being advanced along the length of the griddle.

8. A machine and griddle according to claim 7, wherein the at least one end of the griddle includes a trough extending the width of the griddle, the trough having at least one tube extending along a length thereof, the tube having openings therein which permit the discharge of a spray of fluid against the planer blade when the machine is situated above the trough, the spray of fluid removing dough from the planer blade.

9. A machine according to claim 8, wherein the trough includes two spaced-apart tubes having a plurality of openings along the length thereof, the openings in the tubes being positioned so as to direct a spray of water upwardly and inwardly toward each other so as to remove dough from the scraper blade when actuated.

10. A machine according to claim 8, wherein each of the end members has a pair of wheels mounted thereon, and the means on the surface of the griddle for maintaining alignment of the machine comprises a longitudinally extending block member mounted on the surface of the griddle, an outer vertical surface of the block member being engaged by adjacent inner surfaces of the pair of wheels mounted on one of the end members, the pair of wheels mounted on the other of the end members having outer annular flange portions, inner edges of the flange portions engaging a cooperating corner of the griddle.

* * * * *